United States Patent
Duda et al.

(10) Patent No.: US 9,691,424 B2
(45) Date of Patent: Jun. 27, 2017

(54) BOLOMETER FOR INTERNAL LASER POWER MONITORING IN HEAT-ASSISTED MAGNETIC RECORDING DEVICE

(71) Applicant: Seagate Technology LLC, Cupertino, CA (US)

(72) Inventors: John Charles Duda, Bloomington, MN (US); Ruoxi Yang, St. Louis Park, MN (US); James Gary Wessel, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/051,053

(22) Filed: Feb. 23, 2016

(65) Prior Publication Data

US 2016/0284372 A1 Sep. 29, 2016

Related U.S. Application Data

(60) Provisional application No. 62/137,396, filed on Mar. 24, 2015.

(51) Int. Cl.
| | |
|---|---|
| *G11B 11/00* | (2006.01) |
| *G11B 5/60* | (2006.01) |
| *G11B 5/31* | (2006.01) |
| *G11B 5/00* | (2006.01) |
| *G11B 11/105* | (2006.01) |
| *G11B 11/12* | (2006.01) |
| *G11B 11/14* | (2006.01) |

(52) U.S. Cl.
CPC .......... *G11B 5/6088* (2013.01); *G11B 5/314* (2013.01); *G11B 11/10532* (2013.01); *G11B 11/10543* (2013.01); *G11B 11/10547* (2013.01); *G11B 11/12* (2013.01); *G11B 11/14* (2013.01); *G11B 2005/0021* (2013.01)

(58) Field of Classification Search
CPC .......... G11B 2005/0021; G11B 5/6088; G11B 11/10543; G11B 11/10545; G11B 11/10547; G11B 11/12; G11B 11/14
See application file for complete search history.

(56) References Cited

U.S. PATENT DOCUMENTS

| | | | |
|---|---|---|---|
| 8,824,085 B2 | 9/2014 | Wilson et al. | |
| 8,879,189 B2 | 11/2014 | Miyamoto et al. | |
| 9,042,210 B2 | 5/2015 | Macken et al. | |
| (Continued) | | | |

OTHER PUBLICATIONS

File History for U.S. Appl. No. 15/007,772.

*Primary Examiner* — Tan X Dinh
(74) *Attorney, Agent, or Firm* — Hollingsworth Davis, LLC

(57) ABSTRACT

An apparatus comprises a slider having an air-bearing surface (ABS), a write pole at or near the ABS, and a reader at or near the ABS and connected to a pair of reader bond pads of the slider. A near-field transducer (NFT) is formed on the slider at or near the ABS, and an optical waveguide is formed in the slider and configured to receive light from a laser source. A sensor is situated proximal of the write pole at a location within the slider that receives at least some of the light communicated along the waveguide. The sensor may be electrically coupled to the reader bond pads in parallel with the reader, and configured to generate a signal indicative of output optical power of the laser source.

23 Claims, 10 Drawing Sheets

(56) References Cited

U.S. PATENT DOCUMENTS

| | | | |
|---|---|---|---|
| 9,153,272 B1* | 10/2015 | Rausch | G11B 7/1267 |
| | | | 369/13.33 |
| 9,536,555 B1* | 1/2017 | Duda | G11B 5/6076 |
| | | | 369/13.33 |
| 9,558,774 B1* | 1/2017 | Macken | G11B 5/607 |
| | | | 369/13.33 |
| 2011/0299367 A1 | 12/2011 | Naniwa et al. | |
| 2012/0051196 A1 | 3/2012 | Grobis et al. | |
| 2014/0119164 A1* | 5/2014 | Wilson | G11B 5/314 |
| | | | 369/13.32 |
| 2014/0269238 A1 | 9/2014 | Kautzky et al. | |
| 2015/0109892 A1 | 4/2015 | Contreras et al. | |
| 2015/0279430 A1* | 10/2015 | Trantham | G11B 5/314 |
| | | | 369/13.26 |
| 2015/0332725 A1* | 11/2015 | Rausch | G11B 5/012 |
| | | | 369/13.26 |
| 2016/0104514 A1* | 4/2016 | Burnett | G11B 5/6088 |
| | | | 369/13.33 |
| 2017/0032810 A1* | 2/2017 | Macken | G11B 5/6005 |
| | | | 369/13.33 |

* cited by examiner

US 9,691,424 B2

BOLOMETER FOR INTERNAL LASER POWER MONITORING IN HEAT-ASSISTED MAGNETIC RECORDING DEVICE

RELATED PATENT DOCUMENTS

This application claims the benefit of Provisional Patent Application Ser. No. 62/137,396 filed on Mar. 24, 2015, to which priority is claimed pursuant to 35 U.S.C. §119(e), and which is incorporated herein by reference in its entirety.

SUMMARY

Embodiments are directed to an apparatus comprising a slider having an upper surface, a lower air-bearing surface (ABS), and an internal body extending between the upper and lower surfaces. A write pole is situated at or near the ABS, and a reader is situated at or near the ABS and connected to a pair of reader bond pads of the slider. The reader bond pads are configured to electrically bias the reader during read operations. A near-field transducer (NFT) is formed on the slider at or near the ABS, and an optical waveguide is formed in the slider and extends from the upper surface of the slider through the internal body of the slider and to the NFT. The waveguide is configured to receive light from a laser source. A bolometer is situated proximal of the write pole at a location within the internal body of the slider that receives at least some of the light communicated along the waveguide. The bolometer is electrically coupled to bond pads, such as the reader bond pads, for biasing the bolometer, and configured to generate a signal indicative of output optical power of the laser source during write operations.

Other embodiments are directed to an apparatus comprising a slider having an air-bearing surface (ABS), a write pole at or near the ABS, and a reader at or near the ABS and connected to a pair of reader bond pads of the slider. A near-field transducer (NFT) is formed on the slider at or near the ABS, and an optical waveguide is formed in the slider and configured to receive light from a laser source. A sensor is situated proximal of the write pole at a location within the slider that receives at least some of the light communicated along the waveguide. The sensor is electrically coupled to the reader bond pads in parallel with the reader, and configured to generate a signal indicative of output optical power of the laser source.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
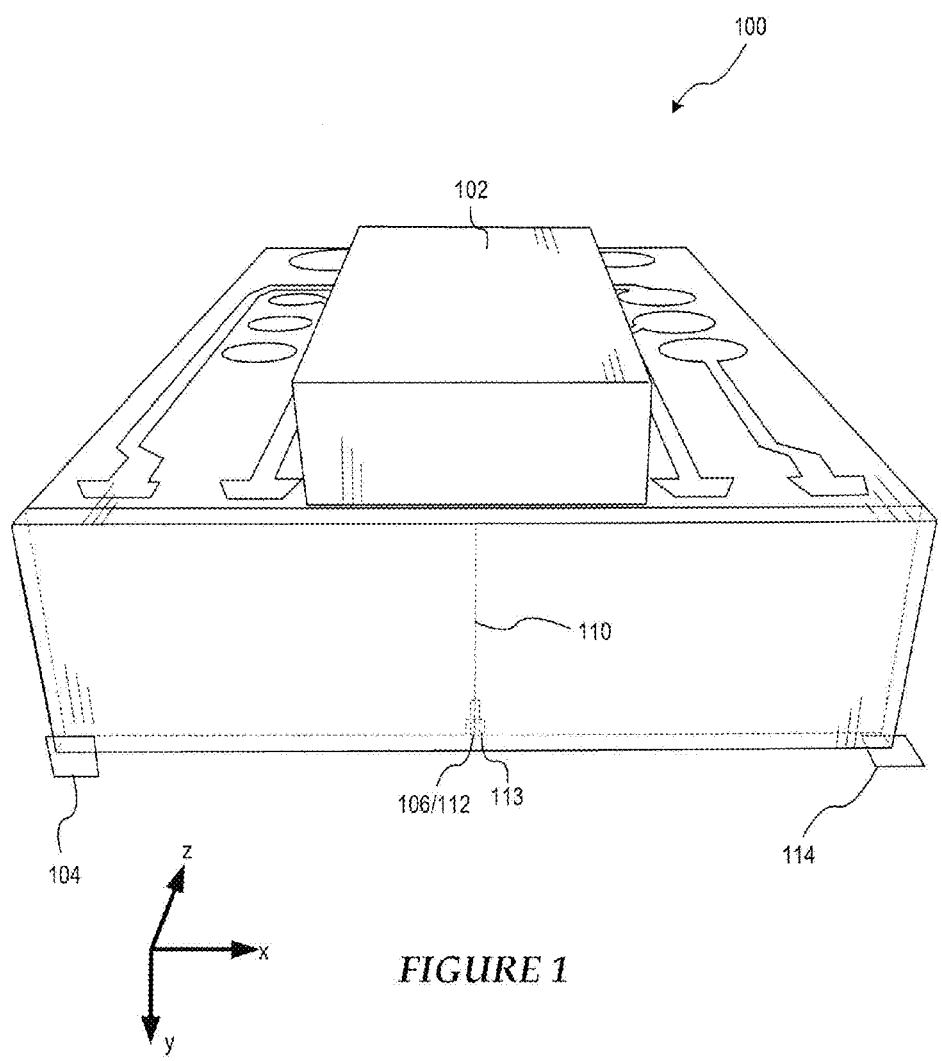
FIG. 1 is a perspective view of a slider in which the various embodiments disclosed herein may be implemented.

The present disclosure generally relates to laser power monitoring in data storage devices that employ heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to paramagnetic effects that can lead to data errors.

A HAMR drive generally uses a laser diode to heat the recording medium to aid in the recording process. The laser diode generates heat and is also heated by other components (writer, reader, heater elements) in the magnetic slider. During write operation, for example, laser diode heating can vary the junction temperature of the laser diode, causing a shift in laser emission wavelength, leading to a change of optical feedback from optical path in slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping and magnetic transition shifting from one block of data to another. Large transition shifts in a block of data may not be recoverable by channel decoding, resulting in error bits.

Monitoring of laser power is important to ensure proper operation of the laser diode and to avoid instabilities such as mode hopping. Conventional laser power monitoring involves use of an external photodiode situated on a submount that also supports the laser diode. The photodiode senses optical power output of the laser diode, and can be used to determine if the laser performance is sufficiently stable to ensure adequate writing performance. However, future integrated HAMR recording transducers will not be able to include an external photodiode due to reduced submount dimensions. For HAMR hard drives, it is critical to detect small fluctuations in laser output optical power delivered to the NFT while minimizing any light delivery losses. Typically, an electrical element such as an internal laser power monitor (e.g., photodiode) would require extra, dedicated electrical bond pads. Since additional bond pads add cost and complexity to the head gimbal assembly, it is desirable to provide for sensing of laser output optical power without the need for additional bond pads.

Embodiments of the disclosure are directed to a sensor arrangement internal to the slider that can be used to facilitate monitoring of output optical power of the laser diode. Embodiments of the disclosure are directed to a sensor that can be situated in the vicinity of the light path of the slider yet have substantially no or only negligible impact on waveguide efficiency and/or performance of the NFT. Embodiments are directed to a sensor that shares electrical bond pads of an existing slider component, thereby obviating the need for additional bond pads to bias the sensor.

According to various embodiments, a bolometric sensor can be situated adjacent the core of an optical waveguide formed in the slider so that light produced by the laser diode impinges on or is harvested by the bolometric sensor. The bolometric sensor can be situated in or near the optical light path of the slider so that it absorbs or harvests light communicated along the waveguide, while minimally or negligibly impacting light transmission (e.g., minimal or negligible effect on waveguide efficiency and/or the mode profile along the light delivery path). For example, the bolometric sensor can be situated within the internal body of the slider proximate the core of the waveguide, such as within the cladding of the waveguide. In various embodiments, the bolometric sensor comprises a thin metallic element, such as a wire, with a high thermal coefficient of resistance (TCR).

When a small bias current is applied across the bolometric sensor, any change in bolometric sensor temperature will create a corresponding change in measured voltage. As a result, the bolometric sensor can be used to monitor fluctuations in laser output optical power that cause fluctuations in absorption and temperature in the bolometric sensor. In general, a bolometer-based internal power monitor according to embodiments of the disclosure does not appreciably decrease light path efficiency yet still absorbs enough light to create a sufficiently large signal for detection. Moreover, embodiments of a bolometric sensor do not require any additional bond pads and would ideally be wired in series or parallel with an existing sensor of the recording transducer.

An embodiment of a HAMR slider 100 is illustrated in FIG. 1. As shown, the HAMR slider 100 includes a light source (e.g., a laser diode) 102 located proximate a trailing edge surface 104 of the slider 100. An optical wave (e.g., a laser beam) generated by the light source 102 is delivered to a mode converter 106, such as a higher order mode converter (HOMC), and from the mode converter 106 to an NFT 112 (see FIG. 2) via an optical waveguide 110. Generally, the mode converter 106 may be utilized with an external phase-shifter (not shown) that receives the mode converted light and shifts phase appropriate for exciting the NFT 112. In this configuration, the mode converter 106 can be made compact and introduce negligible optical losses. The optical wave exiting the mode converter 106 is directed onto the NFT 112 located proximate a read/write head 113. The NFT 112 is aligned with a plane of an air bearing surface (ABS) 114 of the slider 100, and one edge of the read/write head 113 is on the ABS 114. The air bearing surface 114 faces, and is held proximate to, a surface 116 of a magnetic medium 118 (see FIG. 2) during device operation. In the following, the ABS 114 is also referred to as a media-facing surface 114.

The light source 102 in this representative example may be an integral, edge firing device, although it will be appreciated that any source of electromagnetic energy may be used. For example, a surface emitting laser (SEL), instead of an edge firing laser, may be used as the source 102. A light source may also be mounted alternatively to other surfaces of the slider 100, such as the trailing edge surface 104. While the representative embodiment of FIG. 1 shows the waveguide 110 integrated with the slider 100, any type of light delivery configuration may be used. For example, in a free-space light delivery configuration, the light source 102 may be external to the slider 100, and coupled to the mode converter 106 by way of optic fibers and/or waveguides. For instance, the slider 100 in one such arrangement may include a grating coupler into which the light source 102 is coupled and the electromagnetic energy may be delivered to the mode converter 106 using the slider-integrated waveguide 110.

Figure 2:
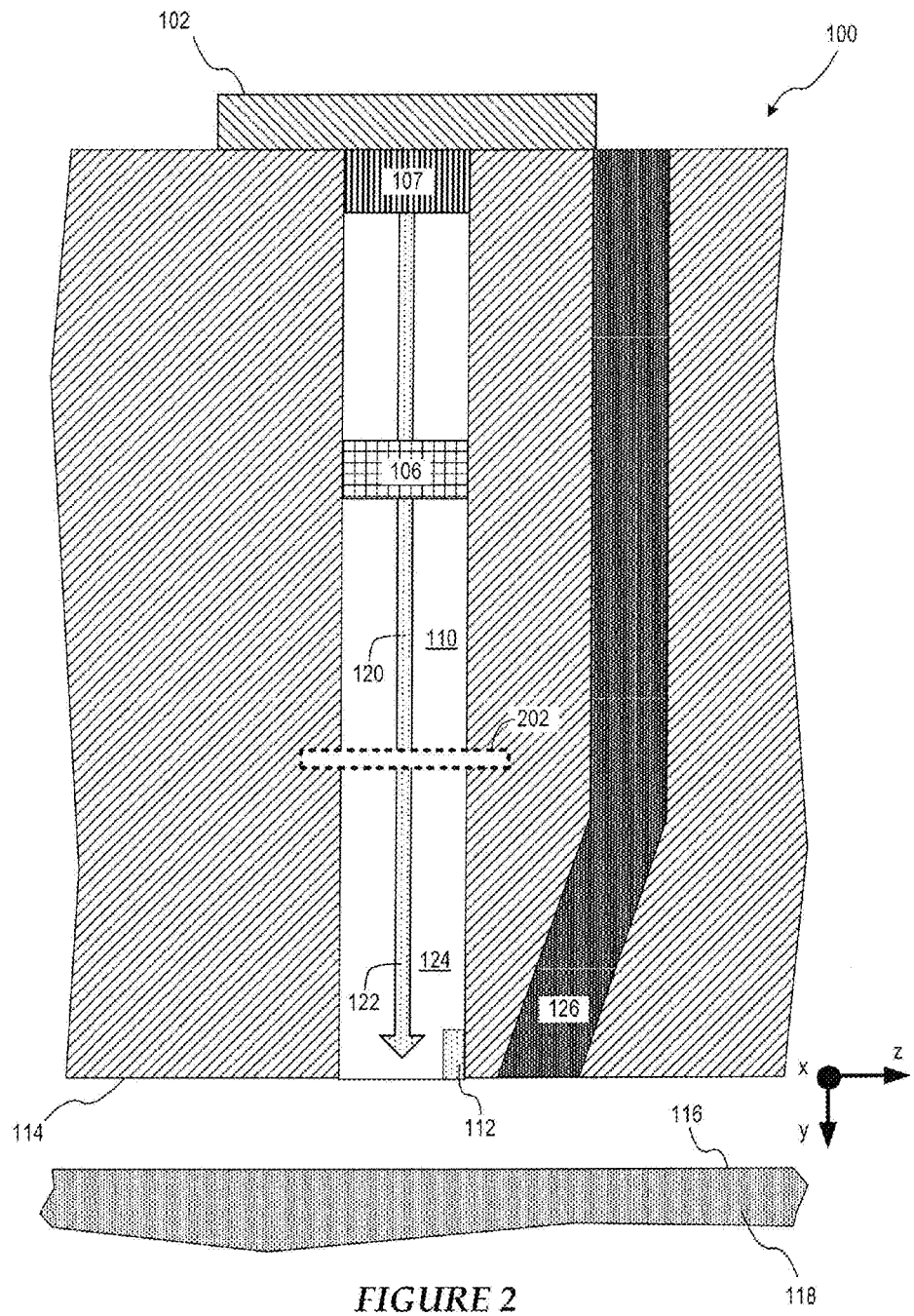
FIG. 2 is a detailed partial cross-sectional view of a slider which incorporates an internal bolometric sensor in accordance with various embodiments.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hotspot over the track of the magnetic medium 118 where writing takes place, as shown in FIG. 2. The light from the source 102 propagates to the NFT 112, e.g., either directly from the source 102 or through the mode converter 106 or by way of a focusing element. Other optical elements, such as couplers, mirrors, prisms, etc., may also be formed integral to the slider. FIG. 2, for example, shows a coupler 107 adjacent the light source 102, which is configured to couple light produced from the light source 102 to the waveguide 110. The optical elements used in HAMR recording heads are generally referred to as integrated optics devices.

The field of integrated optics relates to the construction of optics devices on substrates, sometimes in combination with electronic components, to produce functional systems or subsystems. For example, an integrated optics device may transfer light between components via rectangular dielectric slab or channel waveguides that are built up on a substrate using layer deposition techniques. These waveguides may be formed as a layer of materials with appropriate relative refractive indices so that light propagates through the waveguide in a similar fashion as through an optic fiber.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device configured to generate local surface plasmon resonance at a designated (e.g., design) wavelength. The NFT 112 is generally formed from a thin film of plasmonic material (e.g., gold, silver, copper) on a substrate. In a HAMR slider 100, the NFT 112 is positioned proximate the write pole 126 of the read/write head 113. The NFT 112 is aligned with the plane of the ABS 114 parallel to the read/write surface 116 of the magnetic medium 118. A waveguide 110 and/or the mode converter 106 and/or other optical element directs electromagnetic energy (e.g., light) onto the NFT 112.

The NFT 112 achieves surface plasmon resonance in response to the incident electromagnetic energy. The plasmons generated by this resonance are emitted from the NFT 112 towards the magnetic medium 118 where they are absorbed to create a hotspot. At resonance, a high electric field surrounds the NFT 112 due to the collective oscillations of electrons at the metal surface (e.g., substrate) of the magnetic medium 118. At least a portion of the electric field surrounding the NFT 112 tunnels into, and gets absorbed by, the magnetic medium 118, thereby raising the temperature of a spot on the medium 118 as data is being recorded.

FIG. 2 shows a detailed partial cross-sectional view of an embodiment of the HAMR slider 100 in accordance with various embodiments. As illustrated, the NFT 112 is positioned proximate the ABS (or media-facing surface) 114 and a magnetic write pole 126. The ABS 114 is shown positioned proximate the surface 116 of the magnetic recording medium 118 during device operation. In the orientation illustrated in FIG. 2, the media-facing surface (or ABS) 114 is arranged parallel to the x-z plane. Electromagnetic energy (e.g., laser) 120 from the light source (e.g., laser diode) 102 is delivered to the mode converter 106 via the coupler 107 and propagates along the waveguide 110 in the y-direction. Optical wave 122 exits the mode converter 106 and is delivered to the NFT 112 along waveguide 124 in the y-direction. The NFT 112 generates surface plasmon enhanced near-field electromagnetic energy proximate the surface 116 of the medium 118, and exits the NFT 112 in the y-direction. This may result in a highly localized hot spot (not shown) on the media surface 116 when in close proximity to ABS 114 of the slider 100. The write pole 126 generates a magnetic field (e.g., in a y- or perpendicular direction) used for changing the magnetic orientation of the hotspot on the surface 116 during writing.

The slider 100 shown in FIG. 2 incorporates a sensor 202 situated in the vicinity of the light path (e.g., the waveguide 110) and proximal of the NFT 112 in accordance with various embodiments. According to some embodiments, the sensor 202 comprises an optical-to-thermal transducer configured to respond to fluctuations in output optical power of the laser 102. The sensor 202 may be implemented in the form of a bolometer or bolometric sensor 202, for example. In some embodiments, the sensor 202 comprises a thin metallic wire placed across the light path (e.g., the waveguide 110) within the internal body of the slider at a location between the coupler 107 and the NFT 112. A small fraction of the output optical power of the laser 102 transmitted via the light path is absorbed by the wire and converted into thermal power, thereby increasing wire temperature. Fluctuations in output optical power of the laser 102 correlate to fluctuations in thermal power and temperature of the sensor 202. These fluctuations in temperature can be detected by circuitry configured to monitor the resistance fluctuations in the wire by using a small bias current and a high thermal coefficient of resistance material. Heating by direct absorption of light greatly decreases the response time and increases bandwidth of the output optical power monitor. The wire can be placed in light path or adjacent to optics to harvest scattered light.

According to the embodiment shown in FIG. 2, a bolometric sensor 202 is situated in the vicinity of the light path (e.g., the waveguide 110) and positioned between the mode convertor 106 and the NFT 112. In the embodiment shown in FIG. 2, the bolometric sensor 202 can be positioned away from the NFT 112 or the mode convertor 106 in the y-direction by a distance as small as about 2 µm according to some embodiments. In other embodiments this separation distance can range between about 2 µm and 10 µm. In further embodiments, this separation can be a distance of about 10 µm or greater. For example, the bolometric sensor 202 can be situated between the NFT 112 and the mode convertor 106, such that the bolometric sensor 202 is spaced away from the NFT 112 by a distance between about 2 µm and 50 µm (e.g., between about 2 µm and 30 µm). In general, the data in FIG. 9 suggests that the presence of the bolometer sensor 202 does not disturb the mode profile in the waveguide 110 at distances further than about 2 µm from the bolometer sensor 202. Thus, the minimum separation between the bolometer sensor 202 and any other component of the light deliver system (i.e., input coupler 107, mode converter 106, or NFT 112) is about 2 µm.

As shown in FIG. 2, the bolometric sensor 202 has a longitudinal axis that is oriented transverse to the longitudinal axis of the waveguide 110. More particularly, the bolometric sensor 202 shown in FIG. 2 has a longitudinal axis that is oriented substantially normal to the longitudinal axis of the waveguide 110. In some embodiments, the bolometric sensor 202 is spaced away from a core of the waveguide 110 and positioned above the waveguide 110 in the x-direction. In other embodiments, the bolometric sensor 202 is spaced away from a core of the waveguide 110 and positioned below the waveguide 110 in the x-direction. The bolometric sensor 202 may also be positioned to scavenge otherwise wasted optical energy, although the sensor response may be more limited than when in positions adjacent to the waveguide.

Figure 3:
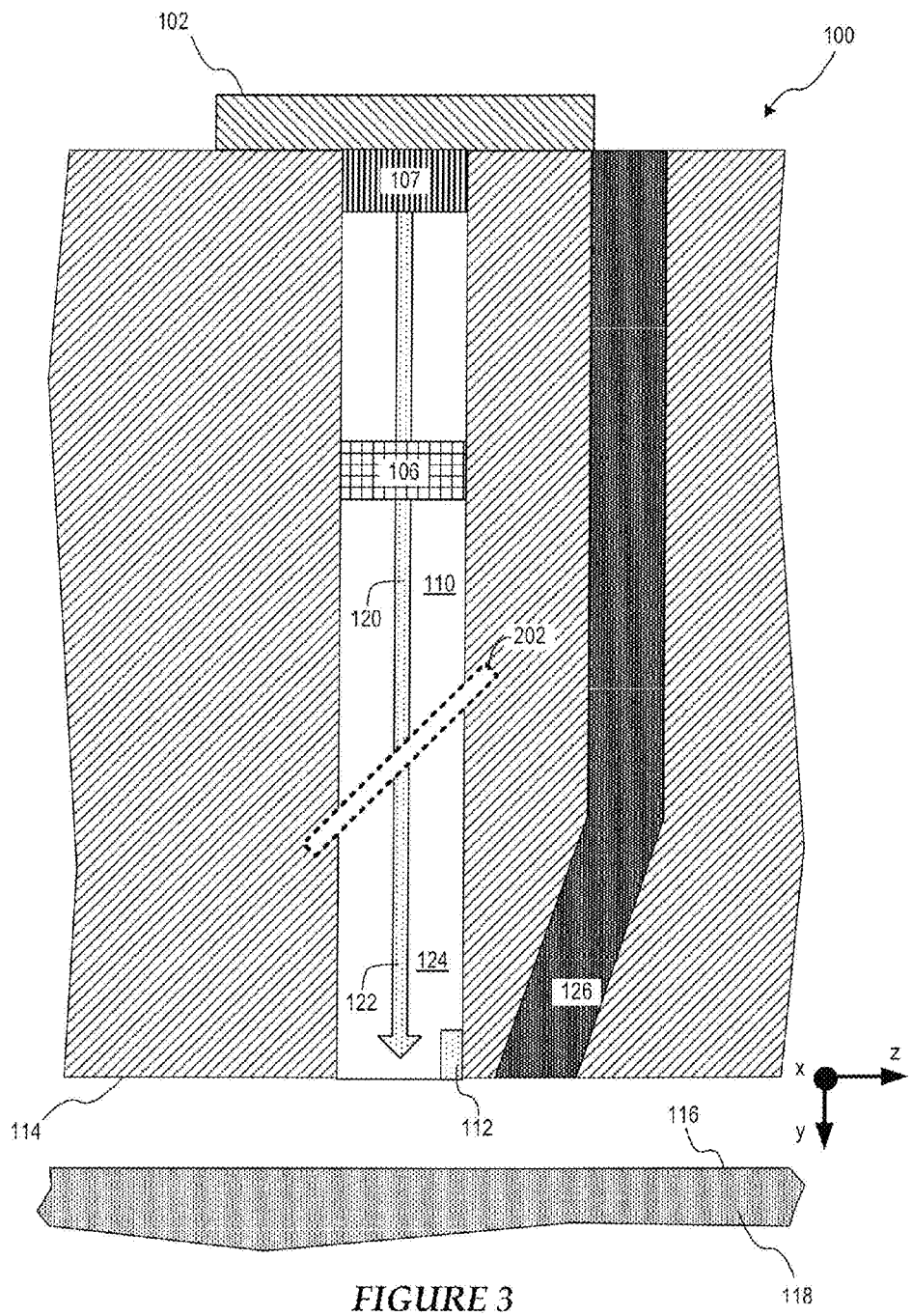
FIG. 3 is a detailed partial cross-sectional view of a slider which incorporates an internal bolometric sensor in accordance with some embodiments.

FIG. 3 shows a variation of the embodiment shown in FIG. 2. As in the case of the embodiment of FIG. 2, the bolometric sensor 202 of FIG. 3 is situated in the vicinity of the light path (e.g., the waveguide 110) and positioned between the mode convertor 106 and the NFT 112. Rather than being oriented normal to the waveguide 110, the longitudinal axis of the bolometric sensor 202 of FIG. 3 is oriented diagonally with respect to the longitudinal axis of the waveguide 110. Orienting the bolometric sensor 202 diagonally with respect to the waveguide 110 serves to expose more surface area of the sensor 202 to optical energy transmitted along the waveguide 110 than a perpendicular orientation of the sensor 202. In the embodiment shown in FIG. 3, the bolometric sensor 202 can be spaced away from the NFT 112 by a distance between about 2 µm and 50 µm (e.g., between about 2 µm and 30 µm).

Figure 4:
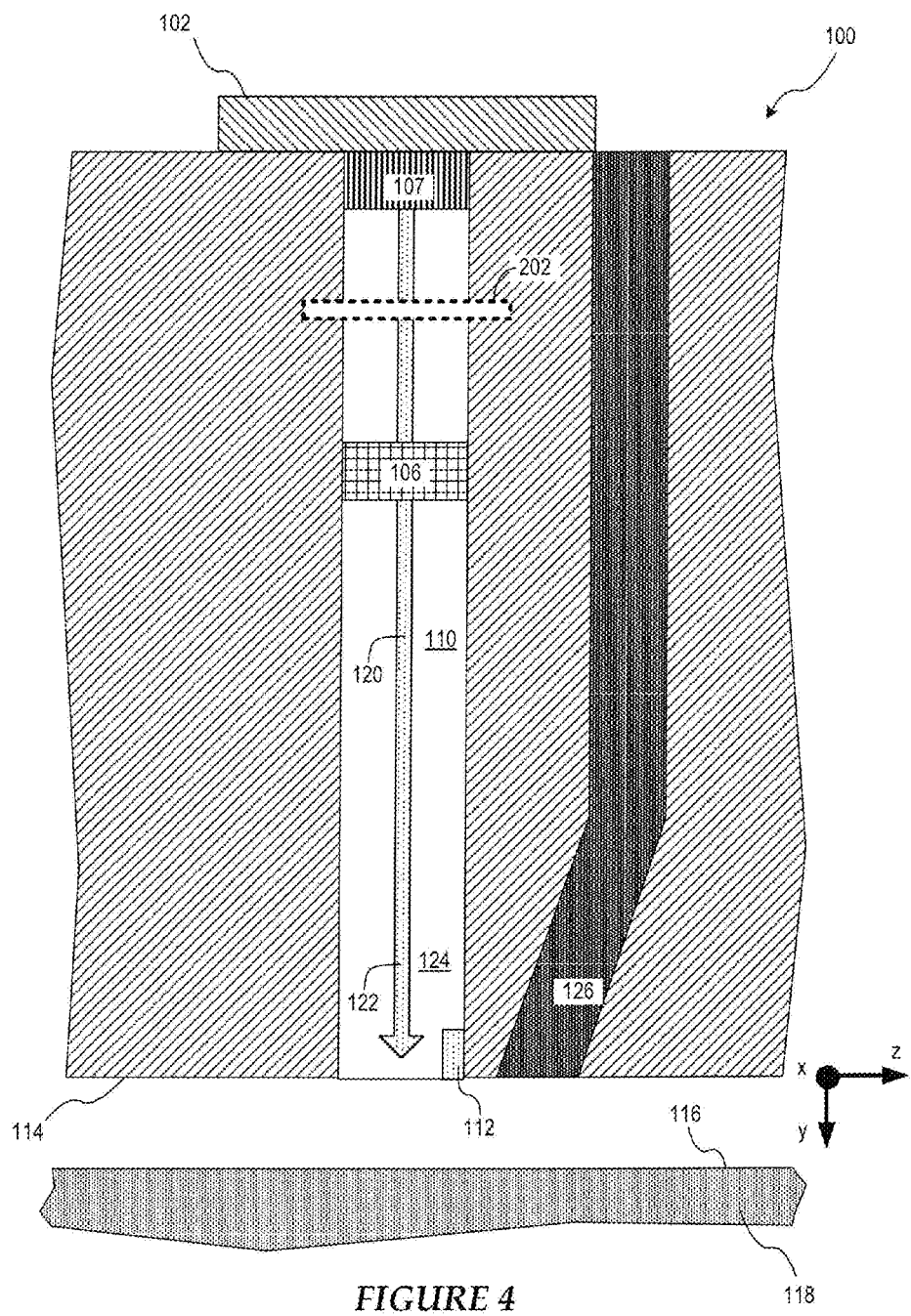
FIG. 4 is a detailed partial cross-sectional view of a slider which incorporates an internal bolometric sensor in accordance with other embodiments.

According to the embodiment shown in FIG. 4, a bolometric sensor 202 is situated in the vicinity of the light path (e.g., the waveguide 110) and positioned between the coupler 107 and the mode convertor 106. In the embodiment shown in FIG. 4, the separation distance in the y-direction between the bolometric sensor 202 and either the mode converter 106 or the input coupler 107 can be as small as 2 µm, a distance between about 2 µm and 10 µm, or a distance of about 10 µm or greater. It is noted that the mode convertor 106 can be spaced away from the NFT 112 by a distance between about 30 µm and 50 µm, and the coupler 107 can be spaced away from the NFT 112 by a distance between about 60 µm and 80 µm. As such, the bolometric sensor 202 can be situated between the mode convertor 106 and the coupler 107 and spaced away from the NFT 112 in the y-direction by a distance of between about 30 μm and 80 μm (e.g., between about 50 and 70 μm).

Figure 5:
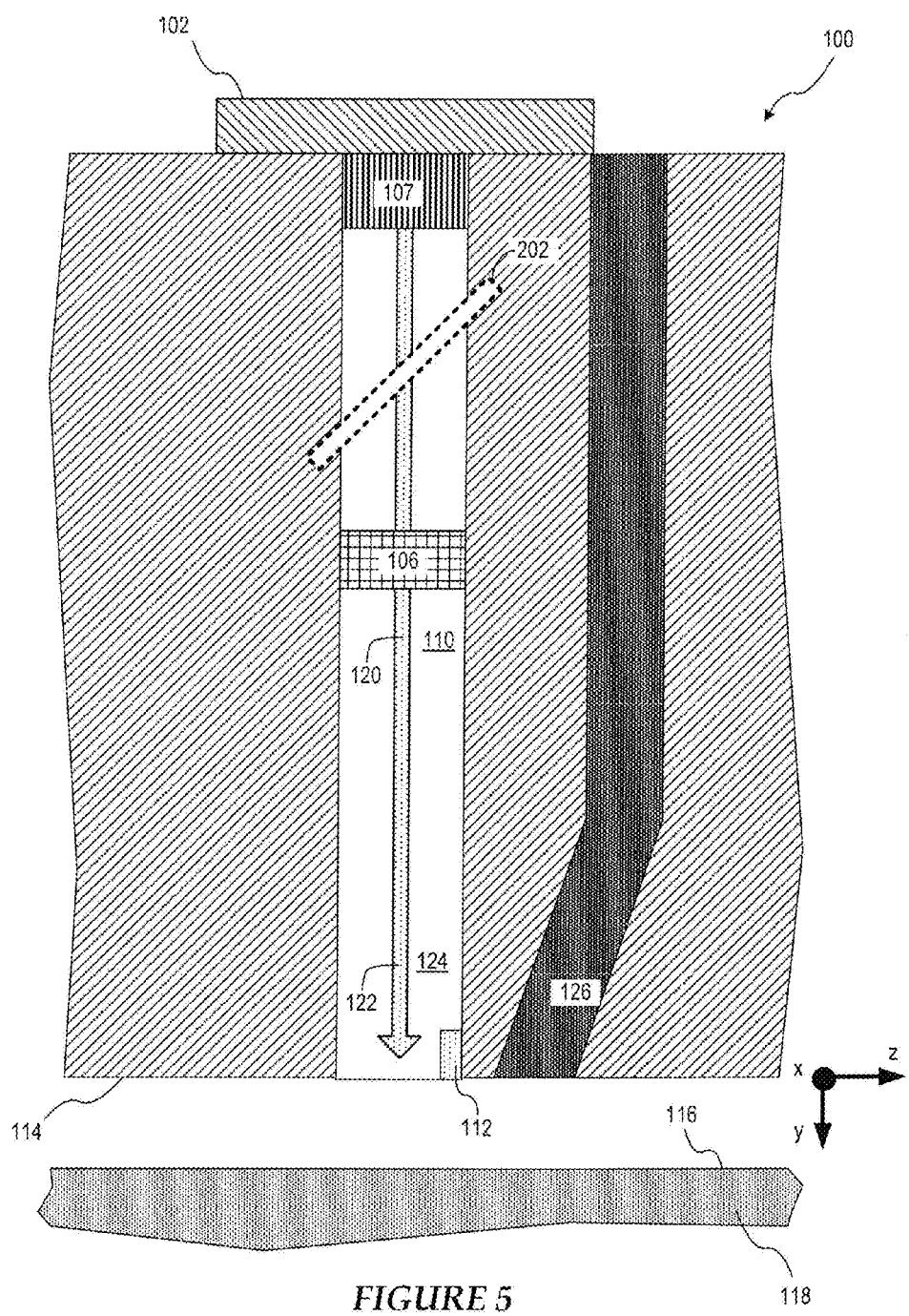
FIG. 5 is a detailed partial cross-sectional view of a slider which incorporates an internal bolometric sensor in accordance with further embodiments.

The bolometric sensor 202 shown in FIG. 4 has a longitudinal axis oriented transverse to the longitudinal axis of the waveguide 110. In particular, the bolometric sensor 202 shown in FIG. 4 has a longitudinal axis oriented substantially normal to the longitudinal axis of the waveguide 110. In some embodiments, the bolometric sensor 202 can be spaced away from a core of the waveguide 110 and positioned above the waveguide 110 in the x-direction. In other embodiments, the bolometric sensor 202 can be spaced away from a core of the waveguide 110 and positioned below the waveguide 110 in the x-direction. FIG. 5 shows a variation of the embodiment shown in FIG. 4. The bolometric sensor 202 of FIG. 5 is situated in the vicinity of the light path (e.g., the waveguide 110) and positioned between the coupler 107 and the mode convertor 106. The longitudinal axis of the bolometric sensor 202 of FIG. 5 is oriented diagonally with respect to the longitudinal axis of the waveguide 110.

Figure 6:
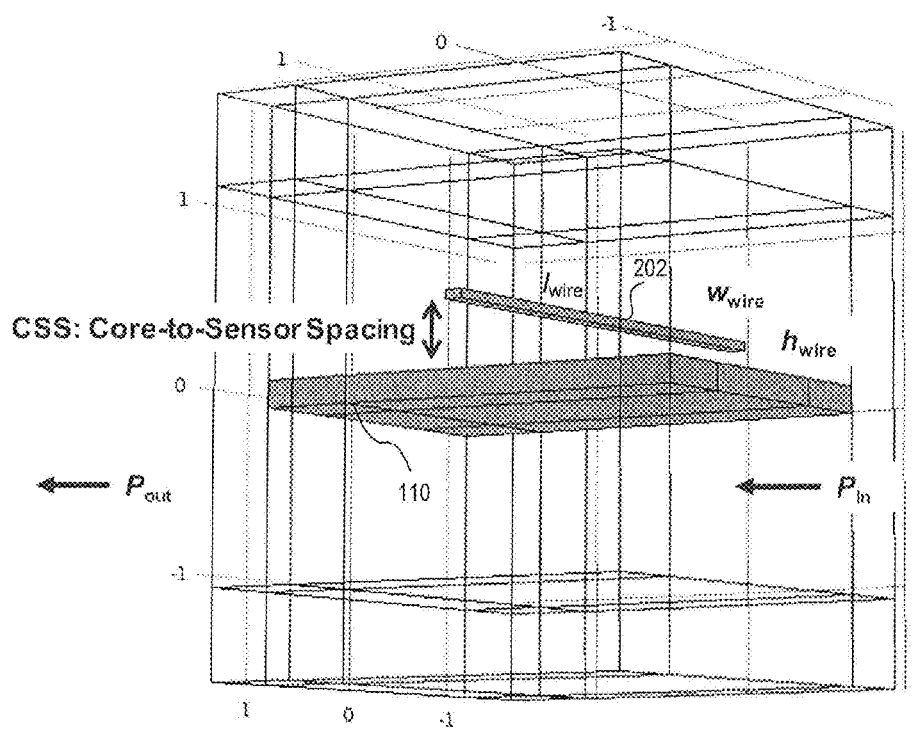
FIG. 6 shows various details of a bolometric sensor incorporated within the internal body of a slider in accordance with embodiments of the disclosure.

FIG. 6 shows various details of a bolometric sensor 202 incorporated within the internal body of a slider in accordance with embodiments of the disclosure. FIG. 6 shows the bolometric sensor 202 spaced apart from the waveguide 110 (e.g., a channel waveguide) by a core-to-sensor spacing, CSS. The bolometric sensor 202 is positioned at a distance CSS away from a core of the waveguide 110 so as to absorb enough optical power to generate sufficient bolometric response yet otherwise minimally (e.g., negligibly) disturb the transmission of optical energy along the waveguide 110. In some embodiments, the bolometric sensor 202 can be formed in the cladding of the waveguide 110, for example. Modeling of one efficacious embodiment included a waveguide core having an index of refraction, n, of 2.06, waveguide cladding having an index of refraction, n, of 1.46, and a sensor wire 202 having an index of refraction, n, of 3.47. The core and cladding had an extinction coefficient, k, of 0, and the wire had an extinction coefficient, k, of 2.8. It is understood that these and other parameter values are provided for non-limiting illustrative purposes.

According to various embodiments, the bolometric sensor 202 can be spaced apart from the waveguide 110 by a core-to-sensor spacing, CSS, of between about 50 nm to 300 nm. In some embodiments, the bolometric sensor 202 can be spaced apart from the waveguide 110 by a core-to-sensor spacing, CSS, of between about 75 nm to 150 nm. In other embodiments, the bolometric sensor 202 can be spaced apart from the waveguide 110 by a core-to-sensor spacing, CSS, of about 100 nm. Experimentation has demonstrated that waveguide efficiency ($P_{out}/P_{in}$) drops as CSS approaches zero and, for channel waveguides, degrades with increasing stripe width. The bolometric sensor 202 can be implemented to include a wire having a width, $w_{wire}$, of between about 50 and 300 nm, a height, $h_{wire}$, of between about 25 and 100 nm, and a length, $l_{wire}$, of between about 1 and 5 μm. Generally, a TCR value of 1.5e-3° C.$^{-1}$ or higher is suitable, though operating conditions can be changed to accommodate a lower TCR value. That is, the measurable signal is proportional to the bias current times the TCR times the change in temperature times the intrinsic resistance of the sensor (i.e., $I*TCR*dT*R_0$), such that a slightly higher bias current can be applied or a higher intrinsic resistance can be designed to compensate for a lower TCR.

Figure 7:
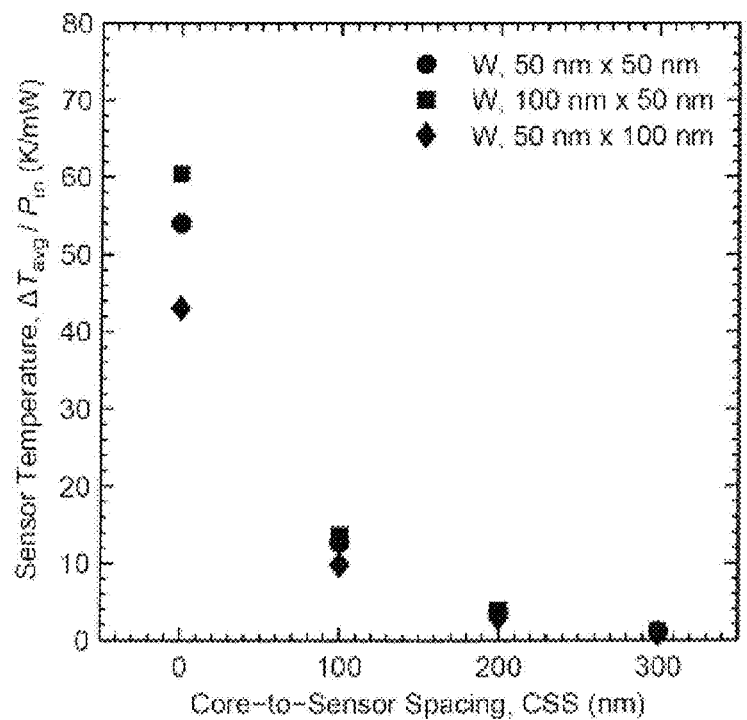
FIG. 7 is a graph showing the temperature response of a bolometric sensor as a function of core-to-sensor spacing, CSS, in accordance with embodiments of the disclosure.
Figure 8:
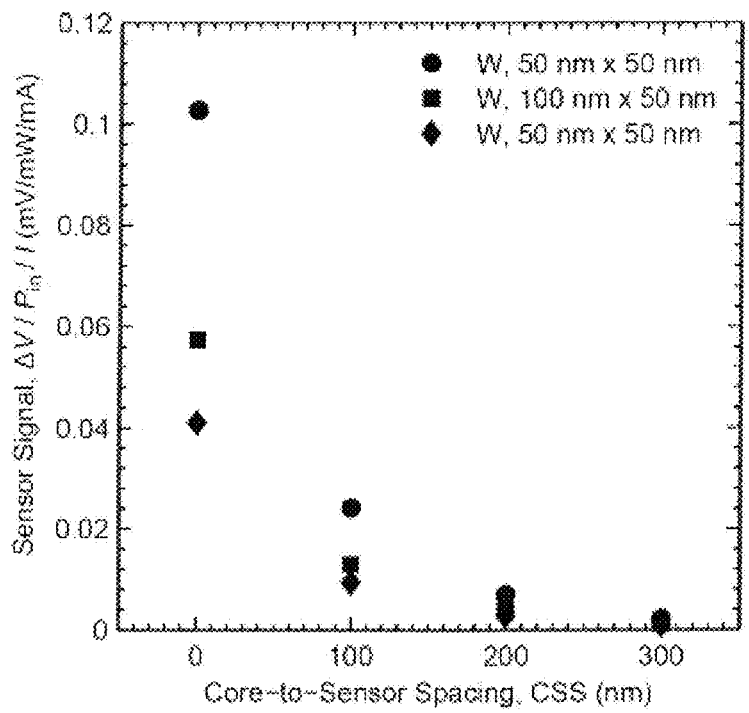
FIG. 8 is a graph showing the response of a bolometric sensor in terms of output sensor signal as a function of core-to-sensor spacing, CSS, in accordance with embodiments of the disclosure.

FIG. 7 is a graph showing the temperature response of a bolometric sensor 202 as a function of core-to-sensor spacing, CSS. The x-axis of the graph shows CSS values between 0 and about 350 nm. The y-axis of the graph shows sensor temperature ($\Delta T_{avg}/P_{in}$(K/mW)) values between 0 and 80. The data for three different wire configurations (1:1, 2:1, and 1:2) are plotted. One wire configuration (plotted as circles) represents a wire having a ratio of width to height of 1:1 (e.g., 50 nm×50 nm). A second wire configuration (plotted as squares) represents a wire having a ratio of width to height of 2:1 (e.g., 100 nm×50 nm). A third wire configuration (plotted as diamonds) represents a wire having a ratio of width to height of 1:2 (e.g., 50 nm×100 nm). FIG. 8 is a graph showing the response of a bolometric sensor 202 in terms of output sensor signal as a function of core-to-sensor spacing, CSS. The x-axis of the graph shows CSS values between 0 and about 350 nm. The y-axis of the graph shows sensor signal magnitude ($\Delta V/P_{in}$(mV/mW/mA)) values between 0 and 0.12. The data for the three different wire configurations (1:1, 2:1, and 1:2) described above are plotted in FIG. 7.

It can be seen from the data of FIG. 7 that the temperature response of the sensor drops with increasing CSS. It is noted that $\Delta T$ changes approximately linearly with output optical power fluctuation. It can be seen from the data of FIG. 8 that the output signal magnitude of the sensor also drops with increasing CSS. The data reflected in FIGS. 7 and 8 was generated from computer modeling using a 1 mA bias current through the sensor wire and 20 mW of laser light transmitted along the waveguide, which yielded a signal of between 0.5 to 2 mV when the CSS ranged between 0 and 100 nm.

Figure 9:
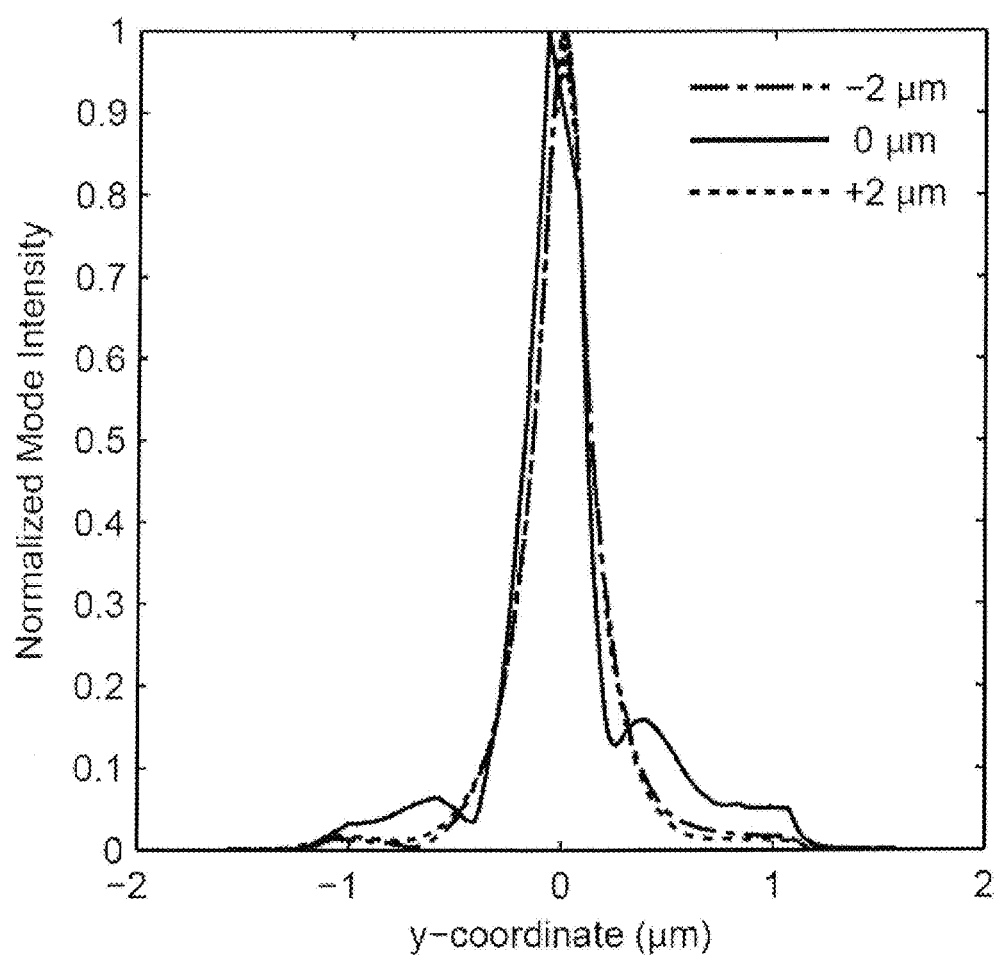
FIG. 9 is a graph that shows the effect presence of the bolometric sensor has on waveguide mode profile in accordance with embodiments of the disclosure.

FIG. 9 is a graph that shows the effect presence of the bolometric sensor has on the waveguide mode profile. The y-axis shows values of normalized mode intensity between 0 and 1. Although a fundamental TE mode is represented in FIG. 9, embodiments of the disclosure are extendable to a higher order mode. The x-axis shows values of position upstream (i.e., −2 μm) and downstream (i.e., +2 μm) of the bolometric sensor within the waveguide in the y-direction (represented in terms of the y-coordinate (μm)). The data plotted in FIG. 9 demonstrates that the waveguide mode is somewhat disturbed by the presence of the bolometric sensor positioned above the waveguide, but recovers downstream within about 2 microns from the sensor. Recovery of the waveguide mode also occurs within about 2 microns from the sensor for a channel waveguide mode of TE(0,0). The degree of mode profile disturbance indicated in FIG. 9 does not have an appreciable impact (i.e. only a negligible effect) on waveguide efficiency ($P_{out}/P_{in}$).

Figure 10:
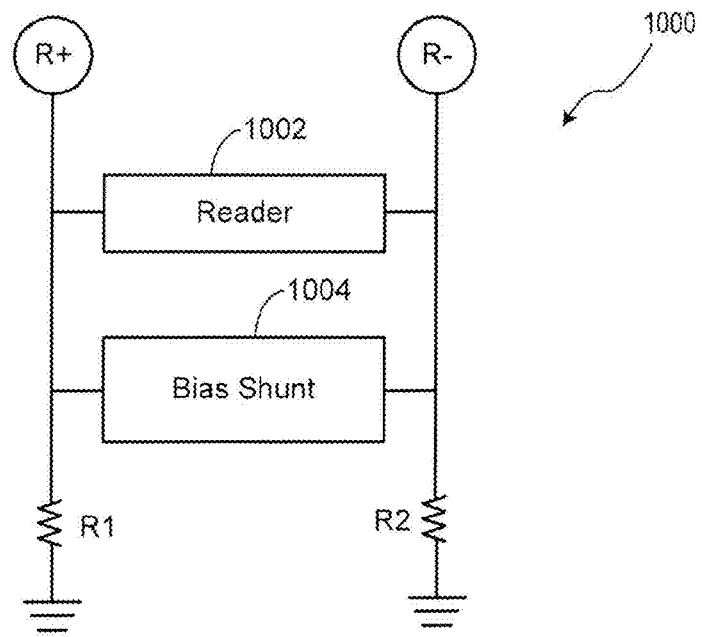
FIG. 10 is a circuit that includes a reader and a bias shunt coupled in parallel to a pair of electrical bond pads of a slider in accordance with embodiments of the disclosure.

Generally, incorporating an electrical element such as a bolometer into a slider would require extra, dedicated electrical pads to bias the element. Since additional bond pads add significant cost and complexity to a head gimbal assembly, embodiments of the disclosure are directed to a bolometric sensor that is electrically connected in series or parallel with another electrical component of the slider. FIG. 10 is a circuit 1000 that includes a reader 1002 coupled to a pair of electrical bond pads (R+ and R−) of the slider. The reader 1002 is also coupled to ground via resistances R1 and R2, typically for purposes of electrostatic discharge (ESD) protection. In some slider implementations, a bias shunt 1004 is coupled in parallel with the reader 1002 as shown in FIG. 10 and typically has a resistance on the order of 1 KΩ.

Figure 11:
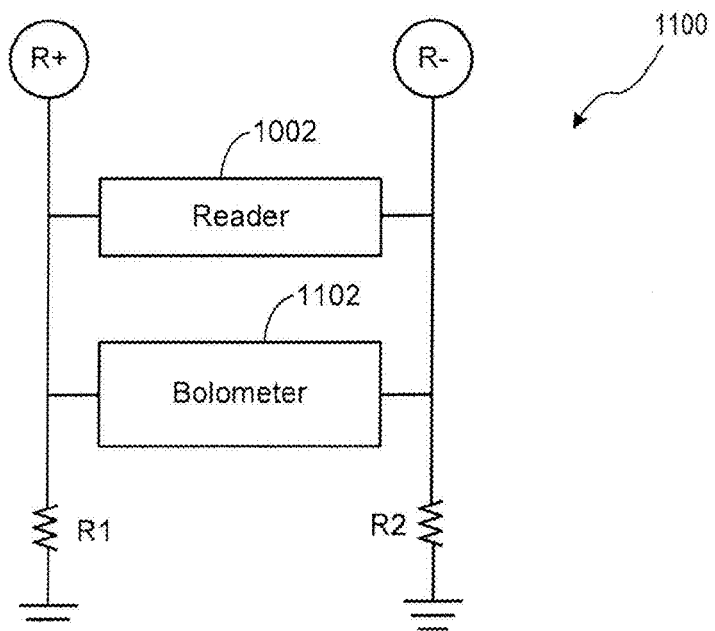
FIG. 11 is a circuit that includes a reader and a bolometer coupled in parallel to a pair of electrical bond pads of a slider in accordance with embodiments of the disclosure.

According to various embodiments of a bolometric sensor incorporated within the interior body of a slider, the bias shunt 1004 is replaced by a bolometer 1102, as shown in FIG. 11. In the circuit 1100 of FIG. 11, the bolometer 1102 serves as both an optical-to-thermal transducer and a bias shunt during read operations. Because reading and writing data are operations that do not occur concurrently in a disk drive, the bolometer 1102 and the reader 1002 can share the same bond pads without interfering with the normal operation of either component. Since the laser is operated only during write operations, the bolometer 1102 need only operate during write operations and need not be operative during read operations. It is noted that the preamp and disk drive firmware need to be modified in order to accommodate time multiplexing of bolometer and reader signals. It is also noted that the bolometer 1102 need not replace an existing component of the slider, such as the bias shunt 1004 shown in FIG. 10, but can be incorporated as an additional slider component coupled in parallel with the reader 1002 as shown in FIG. 11. It is understood that, in some embodiments, the bolometer 1102 can be biased by dedicated bond pads.

Figure 12:
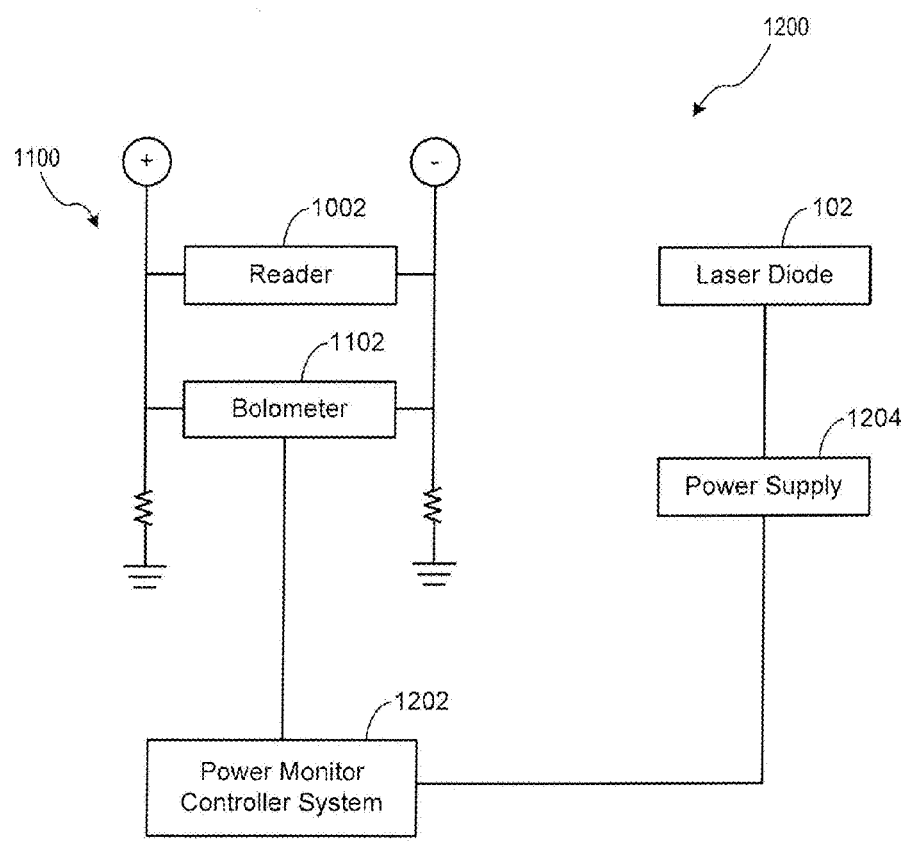
FIG. 12 is a diagram of an output optical power monitor for a heat-assisted magnetic recording slider in accordance with various embodiments.

FIG. 12 is a diagram of an output optical power monitor for a HAMR slider in accordance with various embodiments. The apparatus 1200 shown in FIG. 12 includes the circuit 1100 shown in FIG. 11, with a bolometer 1102 coupled in parallel and sharing bond pads with a reader 1002. The bolometer 1102 is coupled to an optical power monitor controller system 1202 configured to detect fluctuations in the sensor signal produced by the bolometer 1102, such fluctuations corresponding to fluctuations in output optical power of the laser. The optical power monitor controller system 1202 is coupled to a power supply 1204 which supplies power to a laser diode 102. The power supply 1204 is configured to adjust the power supplied to the laser diode 102 in response to signals received from the optical power monitor controller system 1202. Monitoring for fluctuations in output optical power of the laser diode 102 using an internal bolometer 1102 provides for high precision control of output optical power stability of the laser diode 102 and a reduced risk of mode hopping.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
a slider having an upper surface, a lower air-bearing surface (ABS), and an internal body extending between the upper and lower surfaces;
a write pole at or near the ABS;
a reader at or near the ABS and connected to a pair of reader bond pads of the slider, the reader bond pads configured to electrically bias the reader during read operations;
a near-field transducer (NFT) formed on the slider at or near the ABS;
an optical waveguide formed in the slider and extending from the upper surface of the slider through the internal body of the slider and to the NFT, the waveguide configured to receive light from a laser source; and
a bolometer:
situated proximal of the write pole at a location within the internal body of the slider that receives at least some of the light communicated along the waveguide;
electrically coupled to the reader bond pads for biasing the bolometer; and
configured to generate a signal indicative of output optical power of the laser source during write operations.

2. The apparatus of claim 1, wherein the bolometer is connected to the pair of reader bond pads in parallel with the reader.

3. The apparatus of claim 2, wherein the bolometer serves as a bias shunt during read operations.

4. The apparatus of claim 1, wherein the bolometer is configured for operation during write operations and non-operation during read operations.

5. The apparatus of claim 1, wherein the bolometer is situated proximal but spaced apart from a core of the waveguide.

6. The apparatus of claim 1, wherein the bolometer is spaced apart from a core of the waveguide by about 50 to 300 nm.

7. The apparatus of claim 1, wherein the bolometer is situated proximal of the NFT by a separation distance of about 2 µm to 80 µm.

8. The apparatus of claim 1, wherein the bolometer is spaced apart from a core of the waveguide and oriented normal to the core.

9. The apparatus of claim 1, wherein the bolometer is spaced apart from a core of the waveguide and oriented diagonally with respect to the core.

10. The apparatus of claim 1, wherein the bolometer comprises a material having a high thermal coefficient of resistance of about $1.5e-3°$ $C.^{-1}$ or higher.

11. The apparatus of claim 1, wherein:
the waveguide comprises a coupler at a proximal end of the waveguide and a mode converter distal of the coupler; and
the bolometer is situated between the coupler and the mode converter.

12. The apparatus of claim 1, wherein:
the waveguide comprises a coupler at a proximal end of the waveguide and a mode converter distal of the coupler; and
the bolometer is situated between the mode converter and the write pole.

13. An apparatus, comprising:
a slider having an air-bearing surface (ABS);
a write pole at or near the ABS;
a reader at or near the ABS and connected to a pair of reader bond pads of the slider;
a near-field transducer (NFT) formed on the slider at or near the ABS;
an optical waveguide formed in the slider and configured to receive light from a laser source; and
a sensor:
situated proximal of the write pole at a location within the slider that receives at least some of the light communicated along the waveguide;
electrically coupled to the reader bond pads in parallel with the reader; and
configured to generate a signal indicative of output optical power of the laser source.

14. The apparatus of claim 13, wherein the sensor is configured to generate the signal only during write operations.

15. The apparatus of claim 13, wherein the sensor is spaced apart from a core of the waveguide by about 50 to 300 nm.

16. The apparatus of claim 13, wherein the bolometer is situated proximal of the NFT by a separation distance of about 2 µm to 80 µm.

17. The apparatus of claim 13, wherein the sensor is spaced apart from a core of the waveguide and oriented normal to the core.

18. The apparatus of claim 13, wherein the sensor is spaced apart from a core of the waveguide and oriented diagonally with respect to the core.

19. The apparatus of claim 13, wherein the sensor comprises a material having a high thermal coefficient of resistance of about $1.5\text{e-}3°\text{ C.}^{-1}$ or higher.

20. The apparatus of claim 13, wherein:
the waveguide comprises a coupler at a proximal end of the waveguide and a mode converter distal of the coupler; and
the sensor is situated between the coupler and the mode converter.

21. The apparatus of claim 13, wherein:
the waveguide comprises a coupler at a proximal end of the waveguide and a mode converter distal of the coupler; and
the sensor is situated between the mode converter and the write pole.

22. The apparatus of claim 1, wherein at least a portion of the bolometer crosses the waveguide.

23. The apparatus of claim 13, wherein at least a portion of the sensor crosses the waveguide.

* * * * *